United States Patent [19]

Blackwell

[11] 4,214,021

[45] Jul. 22, 1980

[54] COATING PROCESS FOR CORROSION-INHIBITING POLY(ARYLENE SULFIDE) COATING COMPOSITIONS

[75] Inventor: Jennings P. Blackwell, Bartlesville, Okla.

[73] Assignee: Phillips Petroleum Company, Bartlesville, Okla.

[21] Appl. No.: 972,083

[22] Filed: Dec. 21, 1978

Related U.S. Application Data

[62] Division of Ser. No. 832,503, Sep. 12, 1977, Pat. No. 4,145,326, which is a division of Ser. No. 346,834, Apr. 2, 1973, Pat. No. 4,064,084.

[51] Int. Cl.$^2$ .......................... B05D 3/02; B32B 27/06

[52] U.S. Cl. .............................. 427/385 R; 427/388.4; 427/421; 427/429; 427/435; 428/419

[58] Field of Search ................ 260/29.2 R; 106/14.25; 428/419; 427/385 R, 421, 429, 435, 388 C

[56] References Cited

U.S. PATENT DOCUMENTS

| | | | |
|---|---|---|---|
| 2,465,513 | 3/1949 | Carasso | 260/29.2 R |
| 3,035,926 | 5/1962 | Larrieu | 106/14.25 |
| 3,622,376 | 11/1971 | Tieszen et al. | 260/29.2 R X |
| 3,986,996 | 10/1976 | Villa et al. | 260/29.2 R X |
| 3,993,843 | 11/1976 | Vasta | 428/422 |
| 4,064,084 | 12/1977 | Blackwell | 260/29.2 R |

*Primary Examiner*—Ralph S. Kendall
*Assistant Examiner*—Thurman K. Page

[57] ABSTRACT

A process for obtaining a smooth lightly colored cured coating of a poly(arylene sulfide) resin upon a substrate comprising forming a slurry comprising poly(arylene sulfide) resin, inert liquid suspending, and about 0.5 to about 30 parts by weight of sodium nitrite per hundred parts by weight of poly(arylene sulfide) resin, coating the substrate with said slurry, and heating the coating under conditions sufficient to produce a cured coating.

11 Claims, No Drawings

COATING PROCESS FOR CORROSION-INHIBITING POLY(ARYLENE SULFIDE) COATING COMPOSITIONS

This application is a divisional application of Ser. No. 832,503, filed Sept. 12, 1977, and now U.S. Pat. No. 4,145,326, which is a divisional application of Ser. No. 346,834 filed Apr. 2, 1973, now U.S. Pat. No. 4,064,084.

This invention relates to corrosion-inhibiting poly(arylene sulfide) coating compositions and to processes which employ the corrosion-inhibiting poly(arylene sulfide) coating compositions in the formation of cured poly(arylene sulfide) resin coated iron or iron-containing laminates.

In general, it is broadly known to coat iron and iron-containing alloys with poly(arylene sulfide) coating compositions to form cured poly(arylene sulfide) resin coated iron or iron-containing alloy laminates. Representative of some of the prior art coating and curing disclosures are set out in Tieszen et al U.S. Pat. No. 3,622,376, Tieszen U.S. Pat. Nos. 3,634,125 and Grimes et al 3,701,665. Although these and other prior art processes are useful in the preparation of cured poly(arylene sulfide) resin coated iron or iron-containing alloy laminates, it has now been found that corrosion and rust products can form on the surface of the material exposed to moisture and air during coating and/or curing of iron or iron-containing alloys which are deleterious to the recovery of a cured coating which is continuous, uniform, smooth and free of exposed iron or iron-containing alloy substrate. It has now been found that uniform, continuous, smooth, non-pitted cured poly(arylene sulfide) laminate can be prepared from poly(arylene sulfide) coating compositions which selectively employ only certain corrosion-inhibiting agents.

It is an object of the present invention to provide corrosion-inhibiting poly(arylene sulfide) coating compositions.

Another object is to provide a process for the preparation of a poly(arylene sulfide) resin coating on iron or iron-containing alloy substrate that is essentially free of corrosion or rust products.

Still another object is to provide a process for the preparation of a laminate of a cured poly(arylene sulfide) resin on an iron or iron-containing alloy substrate which is essentially free of corrosion or rust products between the resin coating surface and the iron or iron-containing alloy substrate surface.

Other objects, aspects and several advantages of the invention will become apparent from reading the disclosure and the appended claims.

In accordance with this invention, I have discovered that corrosion-inhibiting poly(arylene sulfide) coating compositions can be prepared from mixtures comprising a normally solid poly(arylene sulfide) resin and at least one corrosion-inhibiting agent selected from the group consisting of alkali metal nitrites, benzoates, phthalates; ammonium chromates, benzoates, phthalates; mixtures of alkali metal chromates and alkali metal borates; morpholine and mixtures thereof, which are dispersed in a liquid suspending agent. I have also found a process for the preparation of a laminate structure comprising a normally solid poly(arylene sulfide) resin bonded securely to an iron or iron-containing alloy substrate which provides a continuous, uninterrupted, cured coating of a poly(arylene sulfide) resin-bonded substrate surface which is essentially free of corrosion or rust products.

The term "normally solid poly(arylene sulfide) resins" as used herein is intended to include any normally solid polymer of arylene sulfide which can be used in the practice of this invention. The term "poly(arylene sulfide)" is further meant to include not only homopolymers but also arylene sulfide copolymers, terpolymers and the like. The normally solid aromatic sulfide resins such as poly(p-phenylene sulfide) produced by the reaction of a mixture comprising p-dichlorobenzene, sodium sulfide and N-methyl-2-pyrrolidone, as disclosed in Edmonds et al U.S. Pat. No. 3,354,129, are presently preferred. Poly(arylene sulfides) of this invention preferably will have an inherent viscosity at 206° C. of at least about 0.1, more preferably between about 0.1 and about 0.3, based on a test solution containing 0.20 grams of poly(arylene sulfide) per 50 cc of chloronaphthalene. If desired, the poly(arylene sulfide) can be lightly cured or crosslinked, e.g., by heating in air for a period of about ½ to about 3 hours at about 500° to about 750° F., prior to application in the coating compositions of this invention.

The corrosion-inhibiting agents which can be employed to inhibit corrosion of iron and iron-containing alloy substrates in accordance with the practice of this invention are those selected from the group consisting of alkali metal nitrites, alkali metal benzoates, alkali metal phthalates, ammonium chromates, ammonium benzoates, ammonium phthalates, morpholine, mixtures of alkali metal chromates and alkali metal borates, and combinations thereof. Representative of corrosion-inhibiting agents which are members of the aforesaid group are the following: sodium nitrite, potassium nitrite, lithium nitrite, sodium benzoate, potassium benzoate, rubidium benzoate, potassium phthalate, sodium phthalate, ammonium benzoate, sodium orthoborate, sodium metaborate, sodium tetraborate, potassium orthoborate, rubidium tetraborate, and mixtures thereof.

The liquids employable as liquid suspending agents are any that are inert to the coating composition ingredients providing that the liquids are readily volatilizable during coating and curing of the poly(arylene sulfide) resin on the iron or iron-containing alloy substrates. Among the liquids(s) or liquid combinations which are suitable as suspending agents in accordance with this invention are water, alcohols, aromatic and aliphatic hydrocarbons, as well as liquid solutions and admixtures containing one or more of the aforementioned liquid suspending agents. The presently preferred liquid suspending agents include water, methanol, ethanol, propanol, isopropanol, ethylene glycol or propylene glycol, as well as mixtures of water and monohydric or polyhydric liquids, e.g., methanol and propylene glycol. Representative of suitable aliphatic or aromatic hydrocarbons include such liquids as benzene, toluene, heptane, cyclohexane and mixtures thereof, including other hydrocarbon mixtures such as kerosene, diesel fuel and the like.

The shape of the iron or iron-containing alloy which is employed in the practice of this invention to produce a coated or laminated structure can be any desired shape, including sheeting, wire, coupons, blanks, objects which have been molded, forged, machined, or otherwise formed into specific shapes, and the like.

Preparation of the iron or iron-containing alloy surface prior to the application of the coating compositions of this invention can include any of the conventional surface pretreatment coating procedures common to the art, such as cleaning of the surface with a suitable cleansing agent for removal of oil, grease, dirt and the like; and, as presently preferred in the practice of this invention, grit-blasting of the cleaned surface. Preheating of the substrate surface prior to coating can be employed in the practice of this invention.

Preparation of the corrosion-inhibiting poly(arylene sulfide) coating compositions suitably dispersed in liquid suspending agents can be carried out by any means common to the art, including ball milling, jet mixing, or any other suitable means of incorporating solid insoluble matter into uniform, stable liquid dispersions. In general, for purposes of providing uniform coatings, the poly(arylene sulfide) coating compositions of this invention are preferably prepared from solid ingredients having an average particle size of less than about 200 mesh (75 microns) per U.S. Standard Sieve series. Presently preferred compositions contain solids which have an average particle size within the range of from about 1 to 50 microns.

In addition to poly(arylene sulfide) resins, the corrosion-inhibiting coating compositions of this invention can contain additional materials, such as fluorocarbon polymers, surfactants, fillers, pigments, coloring agents, color stabilizing agents and mixtures thereof. These additional materials advantageously are employed in preparing coated or laminated iron or iron-containing alloy substrates in order to improve the release properties of the coatings, color of the coatings, smoothness of the coatings, and the like. Any surfactant, i.e., any suface-active substance including, broadly, such chemical types as nonionic (polyethylene oxides), anionic (sodium lauryl sulfate) and cationic (cetyl pyridinium chloride) and the like, can be employed in the practice of this invention.

Presently preferred pigments and/or fillers employed in the practice of this invention include titanium dioxide, ferric oxide, glass, asbestos fibers, cobaltic oxide and molybdenum disulfide. Representative color-stabilizing agents that are employable in the practice of this invention include those described in U.S. Pat. Nos. 2,408,342, 3,386,950 and 3,658,753, among others, which disclose the use of hydroxy-substituted amines, e.g., triethanol amine, a monothiol or polythiol, e.g., 1-dodecanethiol or 1,6-hexanedithiol, and phenylphosphinic or dioctyl phosphites as color-stabilizing additives. In addition, advantageously one of the corrosion-inhibiting agents that can be employed in the practice of this invention, i.e., alkali metal nitrites, also provides color stability and color improvement for cured poly(arylene sulfide) resins when employed in amounts in excess of the minimum amount required to inhibit corrosion or rust of iron or iron-containing alloy substrates during coating or curing of the substrate.

Coating of the iron or iron-containing alloy substrates with the poly(arylene sulfide) coating compositions of this invention can be accomplished by any convenient means known in the art. For example, a slurry or polymer and water and/or other suitable liquid suspending agent can be applied to a substrate surface by brushing, spraying, dipping, or by any other suitable means of applying insoluble matter dispersed in the suspending agent to metal substrates.

Following coating of the substrate surface, the resulting coated surface can be maintained even in an uncured condition in a corrosive atmosphere in the presence of moisture and air, for example, relative humidity conditions of 50 to 95 percent, for extended periods of time—up to 2 hours or more—without the formation of any significant or measurable quantities of corrosion on the surface of the iron or iron-containing alloy substrate. "Corrosion" as used herein is intended to include corrosion products such as rust, i.e., iron oxide mixed with hydroxides and carbonates such as ferrous oxide (FeO), ferric oxide ($Fe_2O_3$), ferriferrous oxide ($Fe_3O_4$), ferrous carbonate ($FeCO_3$), and the like. One of the advantages associated with use of the coating compositions of this invention is related to the fact that the coating compositions will retain their corrosion-inhibiting characteristics even when employed under high humidity conditions common to commercial industrial spraying or coating uses. This advantage permits the industrial use of the coatings of this invention in the coating of production items, such as tire molds and the like, wherein prior to curing of the coated molds, the coated molds are retained in the uncured condition for periods of up to 2 hours or more in an uncured condition due to the lack of oven space or other unforeseeable delays.

Following or during coating of the substrate, the resulting coating-laminate is heated in order to cure the coating. During this step the volatilizable liquid suspending agent is evaporated or flashed off, the polymer melts and fuses together and a substantially uniform, smooth, continuous, non-pitted coating is cured to the iron or iron-containing alloy substrate without the deleterious occurrence of corrosion or rust on the substrate surface. Preferably the curing, i.e., crosslinking or chain extension of the coating composition, is done in air at a temperature in the range of about 500° to about 900° F., preferably in the range of about 600° to about 800° F., for a period of time in the range of about 1 minute to about 24 hours, preferably in the range of about 1 minute to about 5 hours, even more preferably from about 15 minutes to about 2 hours. The thickness of any coating can be increased by additional applications of coating composition followed by the same curing procedures. Coating thicknesses of 0.5 to 50 mils can easily be applied which are effective in inhibiting the corrosion of iron or iron-containing alloy substrates. Presently preferred coatings have a thickness of about 1 to about 5 mils; and more preferably a thickness of at least about 2 mils. Any amount of a normally solid material comprising a normally solid poly(arylene sulfide) corrosion-inhibiting agent and liquid suspending agent can be employed in the corrosion-inhibiting poly(arylene sulfide) coating compositions of this invention which effectively limit corrosion of an iron or an iron-containing alloy substrate surface. In general, suitable proportions by weight of normally solid poly(arylene sulfide) resin to corrosion-inhibiting agent are within the range of from about 100:0.5 to about 100:30, preferably from about 100:1.5 to about 100:15. Presently preferred normally solid materials contain from about 50 to about 100 weight percent of a normally solid poly(arylene sulfide) resin wherein the normally solid material contains materials other than a normally solid poly(arylene sulfide) resin, the proportions by weight of normally solid poly(arylene sulfide) resin to other materials are within the range of from about 100:6 to about 100:80, preferably from about 100:5 to about 100:50, and more preferably from about 100:10 to about 100:40. The materials referred to as others of the above normally solid materials comprise fluorocarbon polymers, surfactants, fillers, pigments, color-stabilizing agents, among others. A still even more preferred embodiment of this invention employs a weight ratio of normally solid poly(arylene sulfide) resin to fluorocarbon polymer within the range of from about 100:5 to about 100:15 and a weight ratio of normally solid poly(arylene sulfide) resin to any other materials comprising surfactants, fillers, pigments, and color-stabilizing agents within the range of from 100:25 to 100:35.

In accordance with this invention, it has also been found that alkali metal nitrites can be employed not only as a corrosion-inhibiting agent within the compositions of this invention but also as a color-stabilizing agent. Accordingly, wherein said alkali metal nitrites are employed as a color-stabilizing agent poly(arylene sulfide) resin proportions by weight of normally solid alkali metal nitrites are within the range of from about 100:1.5 to about 100:30. In general, any amount of liquid-suspending agent can be employed which acts as a liquid coating vehicle for a normally solid material and a corrosion-inhibiting agent. In general, suitable proportions by weight of normally solid poly(arylene sulfide) resins to liquid-suspending agent are within the range of from about 100:60 to about 100:900, and preferably from about 100:150 to about 100:300.

Although this invention has been described with respect specifically to iron and iron-containing alloys for the purpose of inhibiting the occurrence of corrosion or rust thereon, it is to be understood that the coating composition of this invention can be applied to other substrates such as copper, brass, glass, ceramics, or any other surface capable of being heated to and cured with the normally solid poly(arylene sulfide) resin compositions of this invention.

The following examples are presented further to illustrate the practice of this invention.

EXAMPLE I

A series of coating compositions containing poly(phenylene sulfide) (abbreviated hereafter as PPS) was prepared in slurry form by ball milling 100 parts by weight of PPS, 33 parts by weight of titanium dioxide, and 266 parts by weight of a water glycol mixture (50—50 by volume) to provide a slurry containing 33 weight percent solids. The PPS employed was a V-1 type resin having an uncrosslinked virgin PPS melt flow of 2000 determined according to ASTM D 1238-70, Condition L. Various materials were tested for corrosion-inhibiting activity at various concentrations by dissolving or slurrying the materials with a small amount of water and then thoroughly mixing the slurried or dissolved materials into the ball milled prepared PPS slurry to provide a resulting test slurry containing corrosion-inhibiting test material. Steel test coupons were cleaned with acetone to remove oils or grease and subsequently grit-blasted. The test coupons were then spray-coated with the test slurry. The uncured coated coupons were then allowed to stand in a closed container to retard evaporation (about 50 percent relative humidity) for a period of 2 hours. At the end of the first hour, the coupons were examined for rust spots and if rust was observed the test was discontinued. If no rust was observed after the second hour, the coated coupon was cured for 30 minutes at 700° F. and again examined for rust or imperfections in the cured PPS coating surface. In another series of tests where the PPS slurries were prepared as described above, the coupons were cleaned, grit-blasted and spray-coated as described above then the coated coupons were allowed to stand in a closed container over water (about 95 percent relative humidity) for a period of 2 hours. At the end of the first hour of the test period the coupons were examined for rust and if rust was observed the test was discontinued. If no rust was observed at the end of the second hour, the coated coupon was cured for 30 minutes at 700° F.

The inspection at the end of the first and second hours of the uncured coated coupons was done without magnification of rust spots which were visible to the naked eye. The cured coat was inspected under 20X magnification to detect small imperfections caused by poor adhesion to rust spots on the substrate and other surface irregularities.

Table I set out hereinafter gives the results of the tests where the coated coupons were kept in a closed container at about 50 percent relative humidity to retard evaporation of the moisture from the film. Table II gives the results of tests made by putting the sprayed coupons in the closed vessel over water at about 95 percent relative humidity.

The foregoing data illustrate that only certain corrosion-inhibiting additives, such as alkali metal nitrites, benzoates, and phthalates, ammonium chromates, and benzoates and mixtures of alkali metal salts of chromates and borates avoid the occurrence of rust on an iron-containing alloy substrate for a period of time of at least 2 hours at relative humidity conditions of 50 percent and 95 percent. Other additives, including corrosion-inhibiting additives such as potassium chromate alone or sodium pyrophosphate alone, do not prevent the occurrence of rust spots when the coating compositions are retained at relative humidities of 50 to 95 percent for extended periods of time and are therefore not suited to the practice of this invention.

TABLE I

EFFECT OF ADDITIVES ON RUST FORMATION IN 50% RELATIVE HUMIDITY

| Additive | Amount in Slurry (Wt. %) | Rust Formation After: 1 Hr. | 2 Hr. | Curing | Cured Coating Appearance |
|---|---|---|---|---|---|
| None | — | Rust spots | | | |
| Copper acetate | 1 | Rust spots | | | |
| Nickel sulfate | 1 | Rust spots | | | |
| Ammonium hydroxide | 1 | Rust spots | | | |
| Sodium nitrite | 1 | None | None | None | Smooth |
| Ammonium chromate | 1 | None | | None | Smooth |
| Potassium chromate | 0.5 | None | Rust spots near edge | | |
| Potassium chromate | 2 | None | None | None | Yellow - sl. roughness |
| Potassium chromate | 0.5 | A few rust | Numerous | | |

TABLE I-continued

| EFFECT OF ADDITIVES ON RUST FORMATION IN 50% RELATIVE HUMIDITY | | | | | |
|---|---|---|---|---|---|
| | Amount in | Rust Formation After: | | | Cured Coating |
| Additive | Slurry (Wt. %) | 1 Hr. | 2 Hr. | Curing | Appearance |
| plus acetone (33%) | | spots | rust spots | | |

TABLE II

| Effect of Additives on Rust Formation in 95% Relative Humidity | | | | | |
|---|---|---|---|---|---|
| | Amount in | Rust Formation After: | | | Cured Coating |
| Additive | Slurry, Wt. % | 1 Hr. | 2 Hr. | Curing | Appearance |
| None | — | Rusts | | | |
| Amine D | 1 | Rusts | | | |
| Ethomeen L15/15* | 1 | Rusts | | | |
| Priminox T-5* | 1 | Rusts | | | |
| Benzotriazole | 1 | Rusts | | | |
| Triethanolamine | 1 | Small rust spots | | | |
| Sodium bisulfite | 1 | Rusts | | | |
| Magnesium oxide | 1 | Small rust spots | | | |
| Pine oil | 1 | None | Small rust spots | | |
| Sodium pyrophosphate | 1 | Small rust spots | | | |
| Ammonium pyrogallate | 1 | Darkened | | | |
| Ammonium tannate | 1 | Darkened | | | |
| Potassium chromate | 1 | None | Small rust spots | | |
| Potassium chromate plus Borax | 0.5 | None | None | None | Slight roughness |
| Sodium nitrite | 1 | None | None | None | Smooth |
| Sodium benzoate | 1 | None | None | None | Slight roughness |
| Ammonium benzoate | 1 | None | None | None | Smooth |
| Morpholine | 1 | None | None | None | Smooth |

*Ethoxylated long chain amines

EXAMPLE II

Sodium benzoate and sodium nitrite were tested as rust-inhibiting additives in coating compositions comprising a series of poly(phenylene sulfide) test slurries. The poly(phenylene sulfide) slurries were prepared by ball milling 100 parts by weight of PPS, 33 parts by weight of titanium dioxide, with or without 10 parts by weight of polytetrafluoroethylene powder in 266 parts by weight of a water-propylene glycol (60-40 parts by volume) or water to provide a slurry containing approximately 33 weight percent solids. The PPS employed was a V-1 type resin having an uncrosslinked virgin PPS melt flow 2000 determined according to ASTM D 1238-70, Condition L, modified to operate at 350° C. Steel test coupons of mild carbon steel were cleaned with acetone to remove oils, grit-blasted, and then spray-coated with the PPS test slurry. The coated coupons were then placed in the closed container with water (about 95 percent relative humidity) and observed for rust formation over a period of up to 24 hours. After rust was observed in some instances, or if no rust was observed after 18 to 24 hours, the coated coupons were cured 30 minutes at 700° F. After curing the cured coated coupons were examined under 20X magnification for rust spots and the cured coating appearance. A coupon coated with the slurry containing no additive was run with each experiment as a control. Data from these tests are set out in Table III hereafter.

TABLE III

| Effect of Additives on Rust Formation | | | | | |
|---|---|---|---|---|---|
| Formulation* | Additive | Amount in Slurry, Wt. % | Slurry Vehicle** | Rust Formation in 95% Relative Humidity | Cured Coating Appearance |
| A | None | — | W-G | Rust spots in 1 hr. | Poor - rust spots |
| B | None | — | W-G | Rust spots in 1 hr. | Rough |
| B | None | — | W | | |
| A | Sodium benzoate | 0.5 | W-G | Rust spots after 2½ hrs. | Poor |
| B | Sodium benzoate | 0.5 | W-G | Rust spots after 6 hrs. | Poor |
| B | Sodium benzoate | 0.5 | W-G | Rust spots after 1 hr. | Poor |
| A | Sodium benzoate | 1.0 | W-G | No rust after 2 hrs. | Good, smooth |
| A | Sodium benzoate | 1.0 | W-G | No rust after 18 hrs. | Good, smooth |
| B | Sodium benzoate | 1.0 | W-G | Rust on edge after 22 hrs. | Good, except for rust along edge |
| B | Sodium benzoate | 1.0 | W-G | No rust after 24 hrs. | Good, smooth |
| B | Sodium benzoate | 1.0 | W | No rust after 24 hrs. | Good, smooth |
| A | Sodium benzoate | 2.0 | W-G | No rust after 18 hrs. | Good, slight roughness |
| B | Sodium benzoate | 2.0 | W-G | No rust after 22 hrs. | Good, slight roughness |
| B | Sodium benzoate | 2.0 | W-G | No rust after 24 hrs. | Good, slight roughness |
| B | Sodium benzoate | 2.0 | W | No rust after 24 hrs. | Good, smooth |
| B | Sodium nitrite | 0.5 | W-G | No rust after 22 hrs. | Good, smooth |
| B | Sodium nitrite | 1.0 | W-G | No rust after 22 hrs. | Good, slight roughness |
| B | Sodium nitrite | 1.0 | W | No rust after 24 hrs. | Good, smooth |
| B | Sodium nitrite | 2.0 | W-G | No rust after 22 hrs. | Good, slight roughness |

TABLE III-continued

| Effect of Additives on Rust Formation | | | | | |
|---|---|---|---|---|---|
| Formulation* | Additive | Amount in Slurry, Wt. % | Slurry Vehicle** | Rust Formation in 95% Relative Humidity | Cured Coating Appearance |
| B | Sodium nitrite | 2.0 | W | No rust after 24 hrs. | Good, smooth |

*A = 100 PPS/33 TiO; B = 100 PPS/33 TiO /10 polytetrafluoroethylene - all parts by weight

**WG = water-propylene glycol (60/40 parts by volume); W = water. The tests show that a minimum level of 1% by weight of sodium benzoate is required for effective inhibition of corrosion while sodium nitrite at 0.5 weight percent is effective. Thus, the effective amounts to be used will vary but can be readily determined by a rapid test.

As indicated in the foregoing table, sodium benzoate and sodium nitrite with and without polytetrafluoroethylene in water or in a water-propylene glycol mixture are effective in inhibiting rust formation on steel.

EXAMPLE III

A basic coating formulation was prepared comprising 100 parts by weight of PPS, 75 parts by weight of $TiO_2$, 350 parts by weight of water containing 0.1 weight percent surfactant. An amount of sodium nitrite equivalent to 0, 0.4, 0.53, 1.01, 1.33, 1.9 and 2.85 weight percent, based on the total weight of slurry, was added to seven different batches of the basic coating formulation. Carbon steel coupons, cleaned and grit-blasted, were coated with one of the seven formulations. A coating thickness of about 1 mil was applied to each coupon. The uncured coupons were exposed to about 95 percent relative humidity test conditions. Control samples showed rust spots after about ½ hour of exposure at 95 percent relative humidity. None of the other coupons developed rust spots after being exposed for 24 hours at 95 percent relative humidity, and when cured 30 minutes at 700° F., no rust spots developed in the coating.

EXAMPLE IV

Another series of coating formulations which contained the same ingredients in the same proportions as the coatings described in Example III were evaluated to determine the effect of the sodium nitrite additive upon the color of the cured coatings. The test coupons were cleaned, grit-blasted and coated as described in Example III, however the coupons were thereafter immediately dried and cured. The color characteristics of the cured coating compositions were checked thereafter. The results were as follows:

The color of the control with no $NaNO_2$ was brown; with 0.4 and 0.53 weight percent $NaNO_2$, the color lighter but still brown.

At the higher levels, i.e., above 1 weight percent $NaNO_2$, the coupons were considerably lighter. At the highest (2.85 weight percent) level, the coating quality began to deteriorate; it was softer and adherence was poorer.

EXAMPLE V

A carbon steel coupon was coated with a slurry made from 100 parts by weight of PPS, 50 parts by weight of $Fe_2O_3$ pigment, 350 parts by weight of $H_2O$ containing 0.1 percent by weight surfactant, and cured as in Example I. The cured coating color was dark red to maroon and glossy. Addition of 1.0 percent by weight $NaNO_2$ based on total weight of slurry produced cured coating color having a lighter deep red color without gloss.

As indicated by Examples III to V set out hereinbefore, an alkali metal nitrite, i.e., sodium nitrite, can be effectively employed in a dual function of an effective corrosion-inhibiting agent and an effective color stabilizing agent in the practice of this invention.

Reasonable variations and modifications are possible within the spirit and scope of this invention.

What is claimed is:

1. A process for obtaining a smooth lightly colored cured coating of a poly(arylene sulfide) resin upon a substrate comprising forming a slurry comprising poly(arylene sulfide) resin, an inert liquid suspending agent, and about 0.5 to about 30 parts by weight of sodium nitrite per hundred parts by weight of poly(arylene sulfide) resin, coating the substrate with said slurry, and heating the coating under conditions sufficient to produce a cured coating.

2. A process according to claim 1 wherein said slurry comprises about 1.5 to about 30 parts by weight of sodium nitrite per hundred parts by weight of poly(arylene sulfide) resin.

3. A process according to claim 2 wherein said slurry comprises about 60 to about 900 parts by weight of inert liquid suspending agent per hundred parts by weight of said poly(arylene sulfide) resin.

4. A process according to claim 3 wherein said slurry further includes about 5 to about 15 parts by weight of a normally solid fluorocarbon polymer per hundred parts of said poly(arylene sulfide) resin.

5. A process according to claim 4 wherein said poly(arylene sulfide) resin is polyphenylene sulfide and said fluorocarbon polymer is polytetrafluoroethylene.

6. A process according to claim 5 wherein said slurry further includes about 25 to about 35 parts by weight of titanium dioxide per hundred parts by weight of poly(arylene sulfide) resin.

7. A process according to claim 6 wherein said inert liquid suspending agent comprises water.

8. A process according to claim 6 wherein said inert liquid suspending agent comprises a mixture of water and at least one of ethylene glycol or propylene glycol.

9. A process according to claim 4 wherein the weight ratio of said poly(arylene sulfide) resin to said normally solid fluorocarbon polymer is within the range of about 100:5 to about 100:50.

10. A process according to claim 2 wherein said slurry comprises about 5 to about 15 parts by weight of sodium nitrite.

11. A process according to claim 1 wherein said slurry comprises about 1.5 to about 15 parts by weight of sodium nitrite per hundred parts by weight of poly(arylene sulfide) resin.

* * * * *